Feb. 3, 1931.   J. E. CARLIN   1,791,191
SHEARING AND CUTTING MACHINE
Filed Nov. 23, 1928
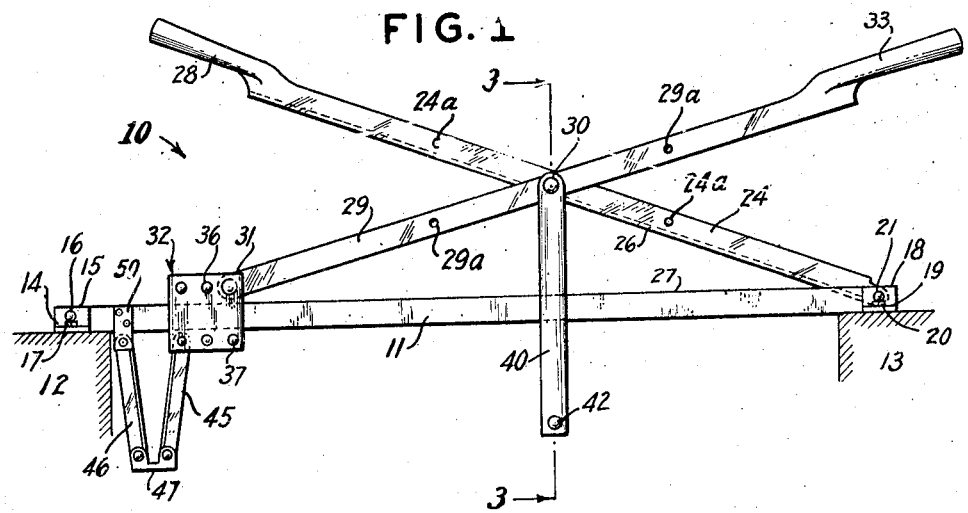
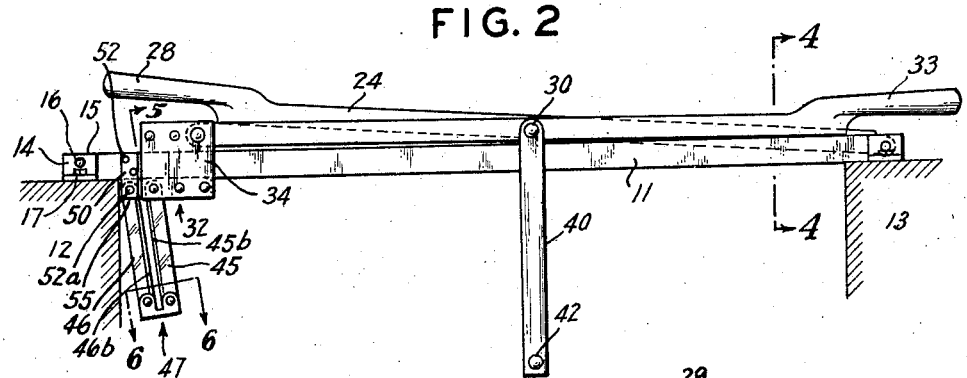
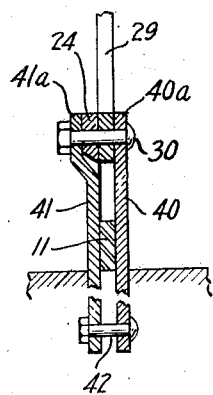
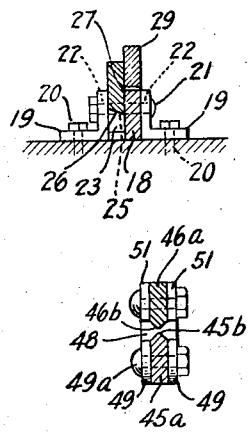
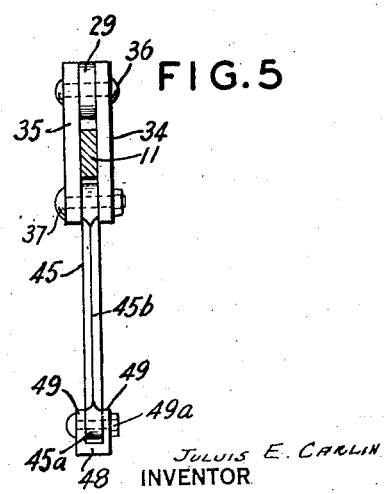
JULIUS E. CARLIN
INVENTOR
BY
ATTORNEY Patented Feb. 3, 1931

1,791,191

UNITED STATES PATENT OFFICE

JULIUS E. CARLIN, OF FREEHOLD, NEW JERSEY

SHEARING AND CUTTING MACHINE

Application filed November 23, 1928. Serial No. 321,290.

This invention relates to manually operable shearing and cutting machines.

An object of this invention is to provide a combined mechanism capable of shearing sheet material and clipping bars, by selective or simultaneous operation.

A feature of this invention is that the machine may be operated by either one or two persons for either cutting the flat stock or the bars and each operator may stand adjacent the end of the machine at which the cutting is being done. Thus each operator is enabled to hold the material to be cut, with one hand and actuate the machine with the other hand.

Another object of this invention is to provide a machine of the character described having compound leverage and toggle means for producing highly increased shearing and clipping forces.

A further object of this invention is to provide an inexpensive and practical machine of the character described which shall comprise few and simple parts, which shall be easy to operate and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention.

Fig. 1 is a front elevational view of a device embodying the invention;

Fig. 2 is a view of the device shown in Fig. 1 showing the machine in position after actuation for a shearing-operation;

Fig. 3 is a cross-sectional view taken on line 3—3 of Fig. 1;

Fig. 4 is a cross-sectional view taken on line 4—4 of Fig. 2;

Fig. 5 is a cross-sectional view taken on line 5—5 of Fig. 2; and

Fig. 6 is a cross-sectional view taken on line 6—6 of Fig. 2.

Referring in detail to the drawing, 10 designates the shearing mechanism embodying the invention. Said mechanism comprises an elongated supporting member 11 secured at its ends to a pair of spaced abutments 12, 13. Said abutments may be work benches, or brackets extending from a single bench. The supporting member 11 is preferably a long flat steel bar and is secured to said abutments in horizontal position on a longitudinal edge thereof. The means for securing said member 11 to said abutments preferably comprises a pair of angle irons 14 secured to one end portion 15 of said member 11 by a bolt 16 and secured to said abutment 12 as by studs 17. At its opposite end portion 18, said member 11 is secured to an abutment 13 by a pair of angle irons 19 disposed on both sides thereof and secured to said abutment by studs 20. A bolt 21 extends thru aligned apertures 22 in the upright portions of said angle irons and said end portion 18. One of said angle irons 19 is spaced from said member 11 a sufficient distance to permit interposing one end 23 of an actuating lever 24, between said angle and member 11. Said end portion 23 is pivotally mounted on a smooth portion 25 of said bolt 21.

Said actuating member 24 is provided with a sharp cutting edge 26 adapted to coact with an edge 27 of said member 11 for shearing. At its free end said lever 24 is provided with a handle portion 28 adapted to be grasped by the hand of an operator for actuating said lever.

A lever member 29 substantially similar to member 24 is pivotally secured thereto in crossed relation, as by a bolt 30. One end 31 of said lever 29 is pivotally secured to a sleeve member 32 slidably mounted on said member 11 adjacent to said end 15 thereof. The free end of said lever 29 is provided with a handle 33 similar to handle 28.

The sleeve 32 comprises a pair of similar plates 34, 35 connected by a row of bolts 36 disposed above member 11 and by a row of bolts 37 disposed below said member. The end 31 of said lever 29 may be pivotally mounted on a bolt 36, between said plates 34, 35 for effecting the pivotal connection for said lever 29. Said lever 29 is thus mounted for movement in the plane of member 11, and the sleeve 32 forms a moving fulcrum for said lever.

It will be now apparent that movement of said levers 24 or 29, effected by pressing either handle 33 or 28, will cause the sleeve 32 to slide toward the left end of member 11 (looking at Figs. 1 and 2). Lifting of either of said levers will of course, cause sliding movement of said sleeve 32 in the opposite direction.

Means is provided for guiding said levers 24, 29 during said pivotal movements, and for preventing twisting of said levers out of their planes of movement. To this end a bar 40 is mounted at its upper end portion 40a on said bolt 30, said end portion being interposed between the head of said bolt and lever 29. A second bar 41 is mounted at its upper end 41a on said bolt 30, said end being interposed between lever 24 and the end of the bolt. Said upper end 41a is bent inwardly. The depending portions of said bars 40, 41 are parallel and straddle said member 11. A bolt 42 connects the lower end portion of said bars. Thus said bars 40, 41 have a close sliding contact with the opposite faces of member 11 during movement of said levers 24, 29.

Sheet material such as galvanized iron plates or sheet steel or tin may be sheared by placing said material between the jaws formed by member 11 and lever 24, on the right of guide bars 40, 41 and pressing down on handle 28 or 33. It will be noted that the shearing may be done on the same side of the machine at which handle 33 of lever 29 extends. The workman may thus hold the material with one hand and press down on said handle 33 with the other hand. The forces exerted on the material being cut is the result of compounded leverage. The pressure on handle 33 of lever 29 causes an increased force to be transmitted to lever 24 thru bolt 30. This force is further increased at the point where the cutting edge 26 strikes the material, since this point is closer to the bolt 21, which is the fulcrum for said lever 24.

The machine 10 is provided with means for cutting or clipping bar stock such as bolts and the like. To this end a member 45 is pivotally mounted at one end between said plates 34, 35 on one of the lower connecting bolts 37. Said member is adapted to coact with a member 46 pivotally mounted at its upper end 55 to said member 11. To effect said pivotal connection, a pair of alined plates 50 are secured to the opposite faces of member 11 as by a pair of bolts 52. Said plates 50 project below the bottom edge of said member 11, the projecting portions being interconnected by a bolt 52a on which said upper end 55 of member 46 is mounted. The lower ends 45a, 46a, of said members 45, 46 respectively are substantially in alignment and are connected by a link member 47. The latter comprises a bottom plate 48 having a pair of upstanding lugs 49 suitably apertured to receive a bolt 49a for mounting said end 45a of member 45. Said plate 48 is also provided with a pair of upstanding lugs 51 suitably apertured to receive a bolt 51a for mounting said end portion 46a of member 46. Said members 45, 46 are provided with sharp edges 45b, 46b respectively, disposed in substantially the same plane and adapted to coact for cutting or clipping material inserted between said members. The clipping of bars between said knife members 45, 46 may be effected by pressing down on either handle 28 or 33. The force is preferably applied at said handle 28 and is transmitted thru bolt 30 to the lever 29, thus forcing the sleeve 32 to the left, and closing the members 45, 46 for the clipping operation. It will be noted that the force transmitted to the point of application is the result of toggle mechanism comprising levers 24, 29 and bar 11, and also of the leverage due to member 45. Said member 45 acts as a lever having a fulcrum at its lower pivoted end. Thus, ordinary downward pressure applied at either handle 28 or 33 will result in a highly increased force for clipping the bars.

The levers 24, 29 are each provided with a pair of openings 24a, 29a respectively, equally spaced from the pivoted bolt member 30. The leverage for shearing may be increased by removing the bolt 30 and reinserting said bolt thru openings 24a, 29a on the left side of the pivot 30 shown in Figs. 1 and 2. Increase of the clipping force may be effected by removing the bolt 30, aligning the openings 24a, 29a on the right of the bolt 30 as shown in Fig. 1, and inserting said bolt thru said openings.

It will be noted that the workman operating the device for clipping the bars, is enabled to stand at the same end of the machine at which the clipping is done. Thus he may hold the bars to be cut with one hand while operating the handle 28 with the other.

Obviously both the clipping of bars and the shearing of sheet material may be carried out simultaneously by two workmen.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawing is to be interpreted as illustrative and not in a limiting sense.

Having thus described my invention I claim as new and desire to secure by Letters Patent:

1. In a device of the character described, in combination, compound leverage shearing mechanism, and clipper mechanism actuated by a toggle forming part of said shearing mechanism.

2. In a device of the character described, in combination, compound leverage shearing mechanism, clipper mechanism actuated by a toggle forming part of said shearing mechanism, and means for simultaneously operating said mechanisms from one or more portions of said device.

3. In a shearing device of the character described, in combination, a stationary member, a lever having a cutting edge, fixedly pivoted thereto, and a second lever having a sliding pivotal connection with respect to said member, said levers being pivotally connected to each other.

4. In a shearing device of the character described, in combination, a stationary member, a lever having a cutting edge, fixedly pivoted thereto, and a second lever having a sliding pivotal connection with respect to said member, said levers being pivoted to each other, one of said levers having a handle portion disposed adjacent the pivotal connection between said other lever and said member.

5. In a device of the character described, in combination, a stationary member, a lever fixedly pivoted thereto and a second lever having a sliding pivotal connection with respect to said member, said levers being pivoted to each other and clipper means cooperating with and actuated by said sliding connection.

6. In a device of the character described, in combination, a stationary member, a lever fixedly pivoted thereto, and a second lever having a sliding pivotal connection with respect to said member, said levers being pivoted to each other, one of said levers having a handle portion disposed adjacent the pivotal connection between said other lever and said member, and clipping mechanism cooperating with and actuated by said sliding connection.

7. In severing mechanism, in combination, a fixed member, a lever having a pivoted sliding connection with said member, a link connecting said lever to said member, and a clipper pivoted to said lever at said connection, and to said member.

8. In shearing mechanism, in combination, a fixed member, a lever having a pivoted sliding connection with said member and a link connecting said lever to said member, said link being provided with a cutting edge adapted to coact with said member for shearing material inserted between said link and member upon actuation of said lever.

9. In combination, a fixed member, a lever having a pivoted sliding connection with said member, a link connecting said lever to said member, said link being provided with a cutting edge adapted to coact with said member for shearing material inserted between said link and member upon actuation of said lever, and cutting mechanism pivotally connected to said member and said sliding connection and adapted to cut material simultaneously with said shearing operation.

10. In combination, a fixed member, a lever having a pivoted sliding connection with said member, a link connecting said lever to said member, said link being provided with a cutting edge adapted to coact with said member for shearing material inserted between said link and member upon actuation of said lever, cutting mechanism pivotally connected to said member and sliding connection adapted to cut material simultaneously with said shearing operation, and guide means for preventing twisting of said lever out of its plane cooperation.

11. In a shearing device of the character described, in combination, a stationary member, a lever having a cutting edge, fixedly pivoted thereto and a second lever having a sliding pivotal connection with respect to said member, said levers being pivoted to each other, each of said levers being provided with handle portions disposed adjacent said pivotal connection between said other lever and said member.

12. In a device of the character described, in combination, an elongated fixed member, a lever having a pivotal sliding connection with said member adjacent one end thereof, a second lever pivoted to said member adjacent the opposite end thereof and pivoted to said first mentioned lever in crossed relation thereto, said second mentioned lever being provided with a cutting edge adapted to coact with said member for shearing material inserted between said link and member, clipping mechanism pivotally connected to said member and said sliding connection, and handle portions extending from the free ends of said levers for carrying out said shearing and clipping operations simultaneously upon pressing down on either of said handle portions.

13. In a device of the character described, in combination, compound leverage shearing mechanism, clipper mechanism actuated by a toggle forming part of said shearing mechanism, and means for varying the leverage of said mechanisms.

In testimony whereof I affix my signature.

JULIUS E. CARLIN.